(12) United States Patent
Kato

(10) Patent No.: US 6,295,163 B1
(45) Date of Patent: *Sep. 25, 2001

(54) DIFFRACTIVE OPTICAL ELEMENT AND SCANNING OPTICAL APPARATUS USING THE SAME

(75) Inventor: Manabu Kato, Toda (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/316,021

(22) Filed: May 21, 1999

(30) Foreign Application Priority Data

May 25, 1998 (JP) .................................................. 10-159956

(51) Int. Cl.⁷ .............................. G02B 5/18; G02B 26/10
(52) U.S. Cl. .......................... 359/575; 359/571; 359/205
(58) Field of Search ..................................... 359/569, 570, 359/565, 571, 575, 566, 17, 206, 205, 216, 613, 614

(56) References Cited

U.S. PATENT DOCUMENTS

| 3,045,532 | * | 7/1962 | Staunton | 359/571 |
|---|---|---|---|---|
| 4,330,175 | * | 5/1982 | Fujii et al. | 359/571 |
| 5,151,826 | * | 9/1992 | Pasco | 359/571 |
| 5,279,924 | * | 1/1994 | Sakai et al. | 359/566 |
| 5,351,264 | | 9/1994 | Kato et al. . | |
| 5,422,753 | | 6/1995 | Harris . | |

FOREIGN PATENT DOCUMENTS

| 0 242 574 | 10/1987 | (EP) . |
|---|---|---|
| 0 332 790 | 8/1989 | (EP) . |
| 0 353 748 | 2/1990 | (EP) . |
| 0 827 004 | 3/1998 | (EP) . |
| 59-116602 | 7/1984 | (JP) . |
| 10-68903 | 3/1998 | (JP) . |
| 94-17435 | 8/1994 | (WO) . |

* cited by examiner

Primary Examiner—Jon Henry
(74) Attorney, Agent, or Firm—Fitzpatrick, Cella, Harper & Scinto

(57) ABSTRACT

Diffraction optical element used in a scanning optical apparatus as a scanning optical element has a diffraction grating formed on a substrate. The diffraction grating has a tilt portion for generating a power and a wall portion connecting one end portion of the tilt portion to the substrate. The wall portion is tilted within a predetermined range with respect to a normal of the substrate surface. The tilt angle of the wall portion of the diffraction grating with respect to the normal of the substrate continuously changes to increase as a distance away from an optical axis of the diffraction optical element becomes large.

7 Claims, 8 Drawing Sheets

DIFFRACTIVE OPTICAL ELEMENT AND SCANNING OPTICAL APPARATUS USING THE SAME

BACKGROUND OF THE INVENTION

1. Field of the invention

The present invention relates to a diffractive optical element and scanning optical apparatus using the same and, more particularly, to an apparatus which records image information by causing a deflection element to deflect a light beam emitted by a light source means formed from a semiconductor laser and optically scanning a surface to be scanned through a scanning optical element (imaging element) having f-θ characteristics, and is suitable for an image forming apparatus such as a laser beam printer (LBP) or digital copying machine having an electrophotography process.

2. Related Background Art

In a conventional scanning optical apparatus used in a laser beam printer, digital copying machine, or the like, a light beam which is optically modulated in accordance with an image signal and is output from a light source means is periodically deflected by an optical deflector such as a rotary polyhedral mirror (polygon mirror), and is focused to form a beam spot on the surface of a photosensitive recording medium (photosensitive drum) by a scanning optical element (imaging element) having f-θ characteristics. Then, the beam spot is scanned on that surface to record an image.

FIG. 1 is a schematic sectional view showing principal part of a conventional scanning optical apparatus of this type.

Referring to FIG. 1, a divergent light beam emitted by a light source means 91 is converted into a nearly collimated light beam by a collimator lens 92, and the light beam (light amount) is limited by a stop 93. Then, the light beam enters a cylinder lens (cylindrical lens) 94 having a predetermined power in only the sub-scanning direction perpendicular to the drawing surface. Of the nearly collimated light beam that enters the cylinder lens 94, light components in the main scanning section directly emerge as a nearly collimated light beam. In the sub-scanning section perpendicular to the drawing surface, light components are focused to form a nearly linear image on a deflection surface (reflection surface) 95a of an optical deflector 95 that comprises a rotary polyhedral mirror (polygon mirror).

The light beam deflected and reflected by the deflection surface 95a of the optical deflector 95 is guided onto a photosensitive drum surface 98 as a surface to be scanned via a scanning optical element (f-θ lens) 96 having f-θ characteristics. By rotating the optical deflector 95 in the direction of an arrow A, the light beam scans the photosensitive drum surface 98 in the direction of an arrow B. In this way, an image is recorded on the photosensitive drum surface 98 as a recording medium.

Conventionally, various scanning optical apparatuses using plastic lenses have been proposed as scanning optical systems because of their capability of highly accurate aberration correction using aspherical surfaces and cost reduction by injection molding.

However, a plastic lens largely changes in its aberration (especially errors in focus or magnification) due to environmental variations. This poses a serious problem in a scanning optical apparatus having a small spot diameter.

Recently, to compensate for aberration variations unique to a plastic lens, some apparatuses have been equipped with diffractive optical elements as a scanning optical system, as proposed in, e.g., Japanese Patent Application Laid-Open No. 10-68903. In this prior art, for example, when ambient temperature increases, chromatic aberration is generated using a diffractive optical element in advance so as to compensate for a change in aberration due to a decrease in refractive index of a plastic lens with a change in aberration due to wavelength variation of a semiconductor laser as a light source. When a diffractive optical element is used singly, the element has a predetermined thickness. Hence, the element manufactured by injection molding is excellent in molding properties.

A diffractive optical element is very useful as the optical system of a scanning optical apparatus. However, the light utilization efficiency (to be referred to as a diffraction efficiency η hereinafter) of a diffractive optical element changes depending on conditions, unlike a refractive optical element. This will be described below using a diffraction grating model.

FIG. 2 is an explanatory view of a diffraction grating-model. This diffraction grating model comprises a continuous grating having a grating pitch of P μm and a grating depth of h μm. The ratio of the grating pitch to the grating depth is called an aspect ratio AR, and it is defined that AR=grating pitch P/grating depth h. A light beam incident on the substrate of the diffraction grating model at an angle of incidence θi is diffracted and emerges in the direction of designed diffraction order.

FIG. 3 is an explanatory view showing the dependence of the diffraction efficiency on the angle of incidence when the aspect ratio AR is 4 in the above diffraction grating model. As is apparent from FIG. 3, the diffraction efficiency greatly changes depending on the angle of incidence, and especially, the diffraction efficiency of a light beam incident at a large angle of incidence lowers.

FIG. 4 is an explanatory view showing the dependence of the diffraction efficiency on the aspect ratio when the angle of incidence on the grating portion is θi=0 in the above diffraction grating model. In FIG. 4, the grating depth h is not changed while the aspect ratio AR is changed by changing the grating pitch P. When the aspect ratio is lower than 4, the diffraction efficiency abruptly decreases.

As is apparent from the above two conditions, when a diffractive optical element is used as the scanning optical system of a scanning optical apparatus, the diffraction efficiency lowers in the off-axis region where the angle of incidence is large and the aspect ratio is low, so the uniformity of an image plane illuminance on a surface to be scanned degrades.

SUMMARY OF THE INVENTION

It is an object of the present invention to provide a diffractive optical element suitable for high-resolution printing, which suppresses a decrease in diffraction efficiency of the diffractive optical element, especially in the off-axis region, increases the uniformity of image plane illuminance on a surface to be scanned, and minimizes aberration changes due to various variations, without increasing cost, with a simple arrangement in which a diffraction grating comprises a tilt portion for mainly generating a power and a wall portion connecting one end portion of the tilt portion to a substrate, and the wall portion is tilted with respect to a normal to the substrate, and a scanning optical apparatus using this diffractive optical element.

A diffractive optical element according to the present invention, which has a diffraction grating formed on a substrate surface and diffracts an incident light beam to obtain a predetermined power, is characterized in that the diffraction grating has a tilt portion for generating a power and a wall portion connecting one end portion of the tilt portion to the substrate, and the wall portion is tilted with respect to a normal to the substrate surface to increase the diffraction efficiency at that portion.

Especially, the element is characterized in that the tilt angle θe of the wall portion of the diffraction grating with respect to the normal to the substrate surface satisfies $$\tan^{-1}(h/P) \leq \theta e \leq \tan^{-1}(h/P)+10°$$

where h is the depth of the diffraction grating, and P is the grating pitch, the tilt angle θe of the wall portion of the diffraction grating with respect to the normal to the substrate surface continuously changes to increase as a distance away from an optical axis of the diffractive optical element becomes large, the diffractive optical element is manufactured by forming the diffraction grating on a glass substrate by a replica process, and the diffractive optical element is manufactured by integrally forming the substrate and the diffraction grating from a plastic material by injection molding.

A scanning optical apparatus according to the present invention, which converts a light beam emitted by a light source into a substantially collimated light beam by a conversion optical element, deflects the converted substantially collimated light beam with a deflection element, and forms an image of the light beam deflected by the deflection element, through a scanning optical element, on a surface to be scanned so as to scan the surface, is characterized in that the scanning optical element comprises at least one refractive optical element and at least one diffractive optical element having a diffraction grating, the diffraction grating being formed on a substrate surface and having a tilt portion for generating a power and a wall portion connecting one end portion of the tilt portion to the substrate, and the wall portion being tilted with respect to a normal to the substrate surface.

Especially, the apparatus is characterized in that the diffraction grating is formed on a side of the surface to be scanned of the diffractive optical element, a tilt angle θe of the wall portion of the diffraction grating with respect to the normal to the substrate surface satisfies $$\tan^{-1}(h/P) \leq \theta e \leq \tan^{-1}(h/P)+10°$$

where h is a depth of the diffraction grating, and P is a grating pitch, a tilt angle θe of the wall portion of the diffraction grating with respect to the normal to the substrate surface continuously changes to increase as a distance from an optical axis of the diffractive optical element becomes large, the diffractive optical element is manufactured by forming the diffraction grating on a glass substrate by a replica process, the diffractive optical element is manufactured by integrally forming the substrate and the diffraction grating from a plastic material by injection molding, the diffractive optical element has different powers in main scanning and sub-scanning directions, the refractive optical element comprises a toric lens made of a plastic and having different powers in main scanning and sub-scanning directions, and the substrate surface comprises a flat surface or a curved surface.

DETAILED DESCRIPTION OF THE PREFERRED EMBODIMENTS

Figure 1:
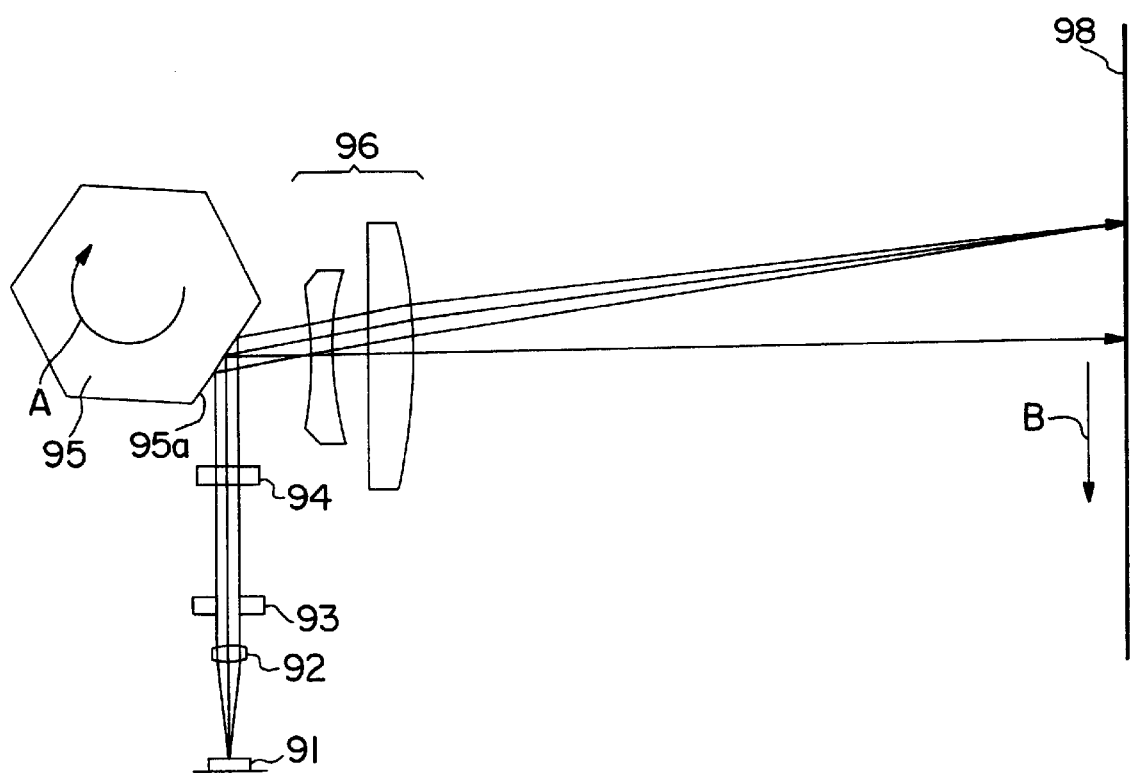
FIG. 1 is a sectional view showing the principal part of a conventional scanning optical apparatus in the main scanning direction.
Figure 2:
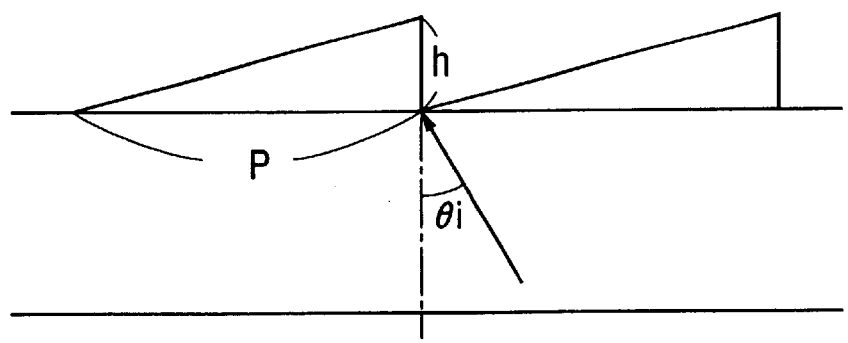
FIG. 2 is an explanatory view showing a grating model of a conventional diffractive optical element.
Figure 3:
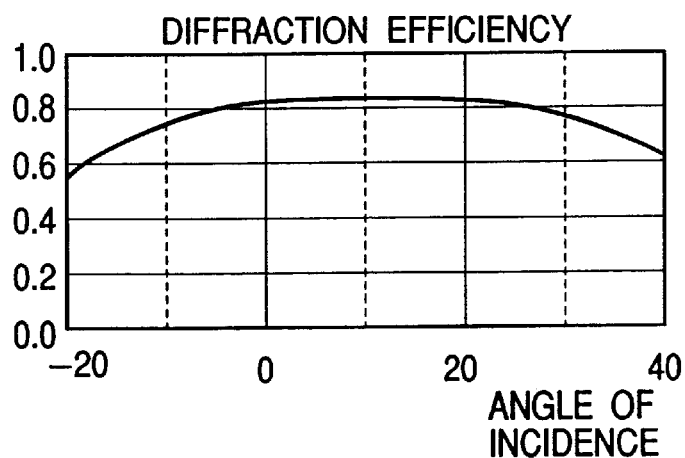
FIG. 3 is an explanatory view showing the dependence of the diffraction efficiency of the conventional diffractive optical element on the angle of incidence.
Figure 4:
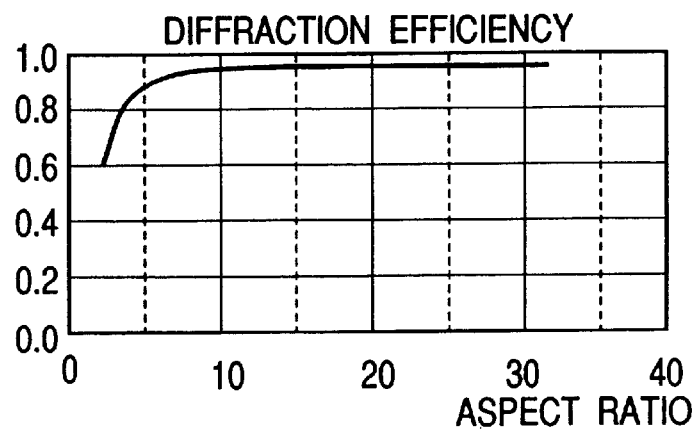
FIG. 4 is an explanatory view showing the dependence of the diffraction efficiency of the conventional diffractive optical element on the aspect ratio.
Figure 5:
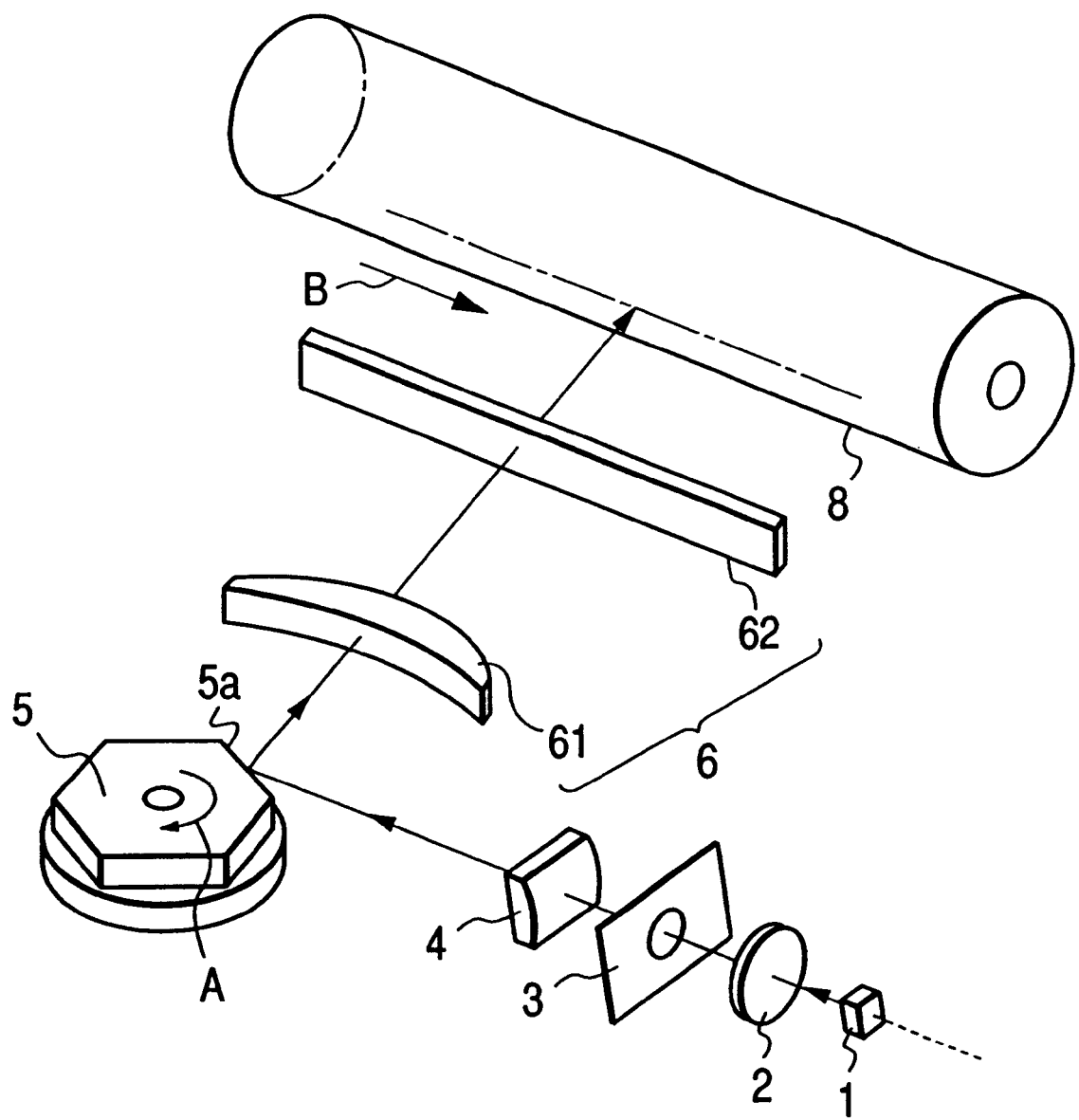
FIG. 5 is a schematic view showing a principal part of a scanning optical apparatus according to the first embodiment of the present invention.
Figure 6:
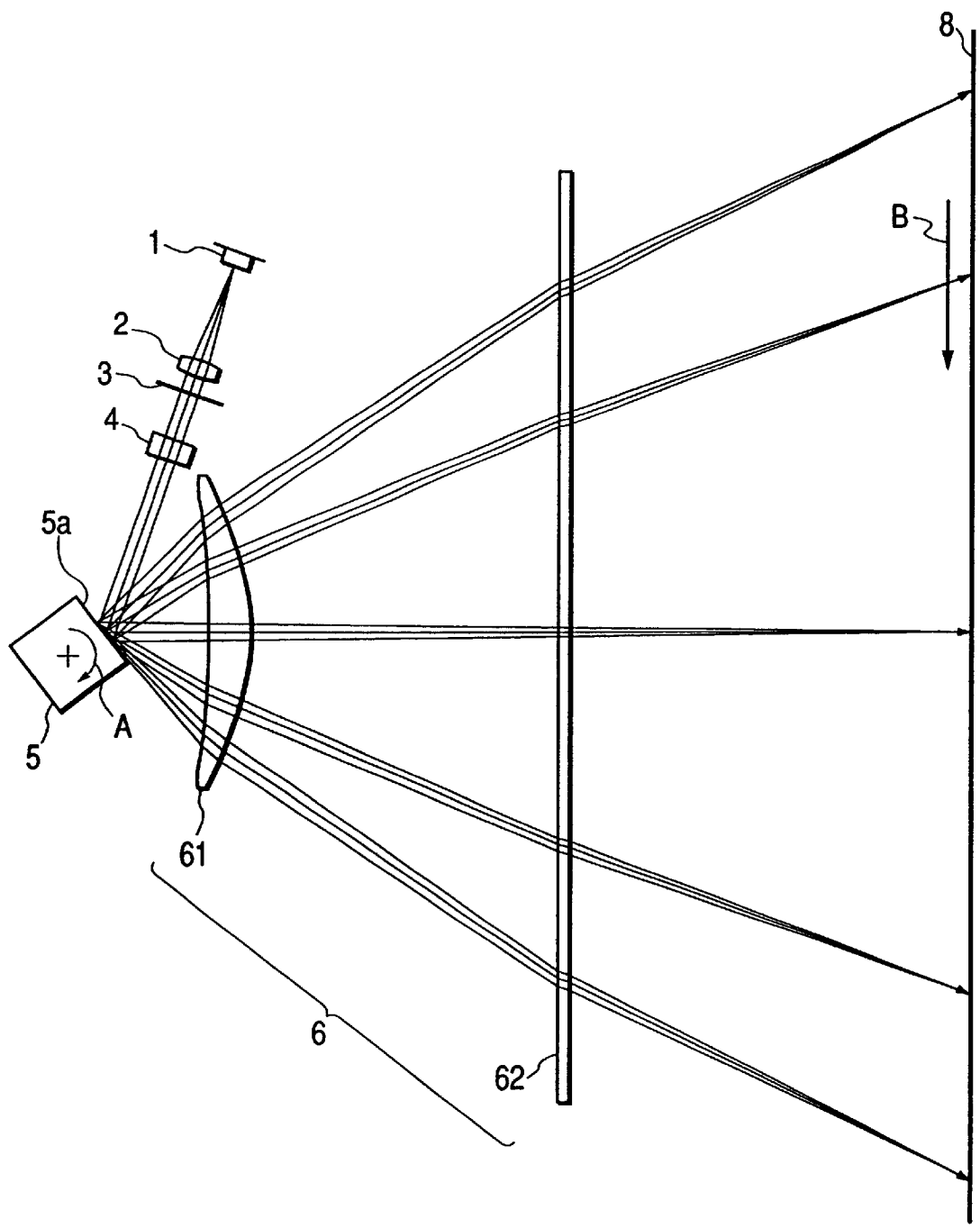
FIG. 6 is a sectional view showing a principal part of the optical system of the scanning optical apparatus shown in FIG. 5 in the main scanning direction.

FIG. 5 is a schematic view showing principal part of a scanning optical apparatus according to the first embodiment of the present invention. FIG. 6 is a sectional view showing a principal part of the optical system of the scanning optical apparatus shown in FIG. 5 in the main scanning direction. The grating portion of a diffractive optical element (to be described later) is exaggerated and has a shape different from the actual shape.

Referring to FIGS. 5 and 6, a light source means 1 comprises, e.g., a semiconductor laser. A conversion optical element 2 (collimator lens) converts a light beam emitted by the light source means 1 into a nearly collimated light beam. An aperture stop 3 limits a light beam (light amount) that passes through it. A cylindrical lens (cylinder lens) 4 has a predetermined power in only the sub-scanning direction perpendicular to the drawing surface of FIG. 6 and forms a nearly linear image of the light beam passing through the aperture stop 3 on the deflection surface of an optical deflector (to be described later) in the sub-scanning section.

An optical deflector 5 is formed from, e.g., a polygon mirror (rotary polyhedral mirror) as a deflection element and rotated by a driving means such as a motor (not shown) in the direction of an arrow A in FIGS. 5 and 6.

A scanning optical element 6 with f-θ characteristics has at least one refractive optical element and at least one diffractive optical element. The refractive optical element is formed from a single toric lens 61 made of a plastic and having different powers in the main scanning and sub-scanning directions. The two lens surfaces of the toric lens 61 in the main scanning direction have aspherical shapes. The diffractive optical element is formed from an elongated diffractive optical element 62 having different powers in the main scanning and sub-scanning directions. A diffraction grating is formed on a substrate surface. The diffraction grating is formed on a surface of the diffractive optical element 62 on a photosensitive drum surface (surface to be scanned) 8 side. The substrate surface is flat. The diffraction grating of the diffractive optical element 62 of this embodiment has a tilt portion for mainly generating a power and a wall portion connecting one end portion of the tilt portion to the substrate. The wall portion is tilted with respect to the normal to the substrate surface. For the diffractive optical element 62 of this embodiment, the substrate and diffraction grating are integrally formed from a plastic material by injection molding. However, the present invention is not limited to this, and a diffraction grating may be manufactured on a glass substrate by a replica process to obtain the same effect. The toric lens 61 is disposed on the optical deflector 5 side of the middle point between the rotating shaft of the optical deflector 5 and the photosensitive drum surface 8, and the diffractive optical element 62 is disposed on the photosensitive drum surface 8 side. The scanning optical element 6 forms an image of a light beam based on image information and deflected by the optical deflector 5 on the photosensitive drum surface 8 and corrects any tilt of the deflection surface of the optical deflector 5.

In this embodiment, a divergent light beam emitted by the semiconductor laser 1 is converted into an almost collimated light beam by the conversion optical element 2. The light beam (light amount) is limited by the aperture stop 3 and enters the cylindrical lens 4. Of the light beam incident on the cylindrical lens 4, light components in the main scanning cross-section are directly output in the collimated state. In the sub-scanning cross-section, the light beam is focused to form an almost linear image (linear image long in the main scanning direction) on a deflection surface $5a$ of the optical deflector 5. The light beam deflected by the deflection surface $5a$ of the optical deflector 5 is guided onto the photosensitive drum surface 8 through the scanning optical element 6. When the optical deflector 5 is rotated in the direction of the arrow A, the light beam scans the photosensitive drum surface 8 in the direction indicated by an arrow B. In this fashion, an image is recorded on the photosensitive drum surface 8 as a recording medium.

In this embodiment, the toric lens 61 and diffractive optical element 62 of the scanning optical element 6 respectively have the following shapes.
(1) Toric lens: aspherical shape whose main scanning direction can be represented by a function up to 10th order.

The intersection between the toric lens and optical axis is defined as the origin. The X-axis is set along the optical axis direction, the Y-axis is set along an axis perpendicular to the optical axis in the main scanning section, and the Z-axis is set along an axis perpendicular to the optical axis in the sub-scanning section. At this time, the generating-line direction corresponding to the main scanning direction is given by $$x = \frac{Y^2/R}{1 + (1 - (1+K)(Y/R)^2)^{1/2}} + B_4 Y^4 + B_6 Y^6 + B_8 Y^8 + B_{10} Y^{10}$$

(where R is the radius of curvature, and K, $B_4$, $B_6$, $B_8$, and $B_{10}$ are aspherical coefficients)

The meridian-line direction corresponding to the sub-scanning direction (direction having the optical axis and perpendicular to the main scanning direction) is given by $$S = \frac{Z^2/r}{1 + (1 - (Z/r')^2)^{1/2}}$$

for $r' = r_0(1 + D_2 Y^2 + D_4 Y^4 + D_6 Y^6 + D_8 Y^8 + D_{10} Y^{10})$ (where $r_0$ is the meridian-line radius of curvature on the optical axis, and $D_2$, $D_4$, $D_6$, $D_8$, and $D_{10}$ are aspherical coefficients)

(2) Diffractive optical element: diffraction surface whose main scanning direction is represented by a function up to the 6th order and sub-scanning direction is represented by a 2nd-order phase function which changes depending on the position of the main scanning direction, which is represented by $$\phi = m\lambda = b_2 Y^2 + b_4 Y^4 + b_6 Y^6 + (d_0 + d_1 Y + d_2 Y^2 + d_3 Y^3 + d_4 Y^4) Z^2$$

(where m is the order of diffraction, and +1st-order diffracted light is used in the first to third embodiments)

Table-1 shows the optical layout in the first embodiment, aspherical coefficients of the toric lens 61, and phase terms of the diffractive optical element 62. In Table-1, the depth of the diffraction grating is h=1.51 μm, the angle of incidence of an off-axis light component on the diffraction grating is θi=22°, and the grating pitch is P=5.6 μm.

TABLE 1

First Embodiment
Design Data

| Wavelength, Refractive Index | | |
|---|---|---|
| Wavelength Used | λ (nm) | 780 |
| Refractive Index of Toric Lens 61 | nt | 1.5242 |
| Refractive Index of Elongated Diffractive Element 62 | nd | 1.5242 |
| Light Ray Angle | | |
| Angle of Incidence on Polygon | θp | 70.0 |
| Polygon Maximum Exit Angle | θe | 45.0 |
| Maximum Angle of Incidence on Surface to be Scanned | θi | 25.0 |
| Layout | | |
| Polygon Axis - Toric Lens | e1 | 36.4 |
| Toric Lens Central Thickness | d1 | 11.0 |
| Toric Lens - Elongated diffractive Element | e2 | 86.0 |
| Elongated Diffractive Element Central Thickness | d2 | 3.0 |
| Elongated Diffractive Element - Surface to be Scanned | Sk | 110.0 |
| Polygon Axis - Surface to be Scanned | L | 246.4 |
| Effective Scanning Width | W | 297.0 |

TABLE 1-continued

First Embodiment Design Data

|  | First Surface | Second Surface |
|---|---|---|
| Surface Shape of Toric Lens 61 | | |
| R | −1.41591E + 02 | −6.18036E + 01 |
| K | 5.27866E + 00 | −6.46577E − 01 |
| B4 | 1.21014E − 06 | 4.20445E − 07 |
| B6 | 7.51335E − 11 | 2.81267E − 10 |
| r | 1.44405E + 02 | −2.51589E + 01 |
| D2a |  | 1.75165E − 04 |
| D4s |  | −3.02404E − 08 |
| D6s |  | 3.83856E − 11 |
| D2e |  | 2.46819E − 04 |
| D4e |  | −9.77441E − 08 |
| D6e |  | 7.36681E − 11 |

Suffices s indicate laser side
Suffices e indicate side opposite to laser

| Surface Shape of Elongated Diffractive Element 62 | | |
|---|---|---|
| R | ∞ | ∞ |
| K | | |
| B4 | | |
| B6 | | |
| Phase Function of Elongated Diffractive Element 62 | | |
| b2 | | −2.50725E − 04 |
| b4 | | −4.31479E − 08 |
| b6 | | 1.23655E − 12 |
| d0 | | −5.78930E − 03 |
| d1 | | −9.57598E − 07 |
| d2 | | 1.15549E − 07 |
| d3 | | 3.71159E − 11 |
| d4 | | 1.23655E − 12 |

Figure 7:
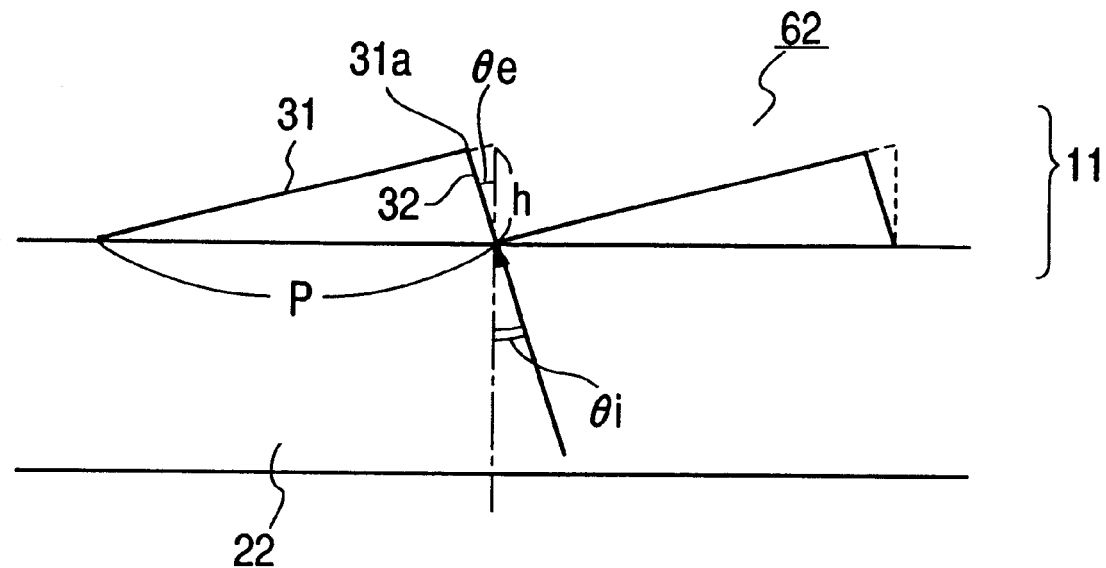
FIG. 7 is an enlarged explanatory view showing a diffractive optical element of the first embodiment of the present invention in the main scanning direction.

FIG. 7 is a sectional view showing a principal part of the diffractive optical element of the first embodiment in the main scanning direction. FIG. 7 shows an enlarged grating portion. Referring to FIG. 7, a diffraction grating 11 comprises a tilt portion 31 for mainly generating a power, and a wall portion 32 connecting one end portion 31a of the tilt portion 31 to a substrate 22. The wall portion 32 is tilted with respect to the normal (to be referred to as a substrate normal hereinafter) to the surface of the substrate 22 by a tilt angle θe. In this embodiment, the tilt angle θe of the wall portion 32 with respect to the substrate normal is set to satisfy a relation $$\theta e = \tan^{-1}(h/P)$$

where h is the depth of the diffraction grating 11, and P is the grating pitch. The tilt angle θe is continuously changed to increase as the distance from the optical axis of the diffractive optical element 62 becomes large. This means that the tilt portion 31 and wall portion 32 of the diffraction grating 11 always make a right angle.

In this embodiment, the tilt angle θe of the wall portion 32 with respect to the substrate normal is continuously changed to increase as the distance from the optical axis of the diffractive optical element 62 becomes large. However, the tilt angle θe may be intermittently changed.

Figure 8:
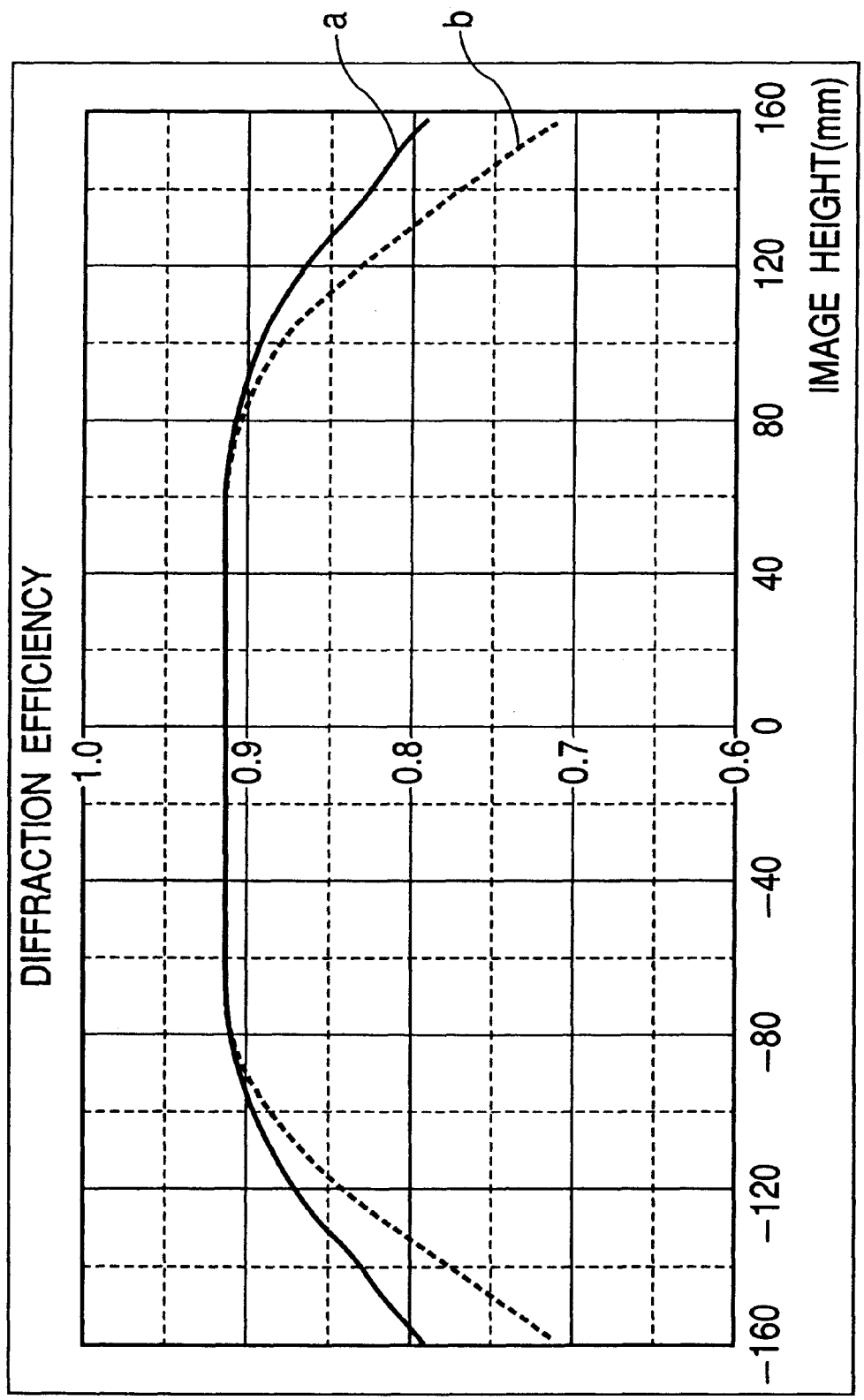
FIG. 8 is an explanatory view showing the diffraction efficiency of the diffractive optical element of the first embodiment of the present invention.

FIG. 8 is an explanatory view showing the diffraction efficiency when the diffractive optical element 62 of the first embodiment is used on an apparatus. The abscissa is converted into a light beam arrival position on the surface to be scanned. The diffraction efficiency is calculated in consideration of the angle of incidence, aspect ratio, tilt angle of the grating wall portion, and the like at each light beam passage position.

Referring to FIG. 8, a solid line "a" indicates the diffraction efficiency in the first embodiment, which is obtained when the wall portion is tilted with respect to the substrate normal by $\theta e = \tan^{-1}(h/P)$. A dotted line "b" indicates a conventional diffraction efficiency obtained when the wall portion is formed perpendicular to the substrate surface.

As is apparent from FIG. 8, when the wall portion of the diffraction grating is tilted with respect to the substrate normal by θe, the diffraction efficiency in the off-axis region can be improved by about 11.7%.

As described above, in the first embodiment, with a simple arrangement in which the diffraction grating 11 of the diffractive optical element 62 comprises the tilt portion 31 and wall portion 32, and the wall portion 32 is tilted with respect to the substrate normal, a decrease in diffraction efficiency due to a large angle of incidence in the off-axis region and low aspect ratio, which poses a problem in use of the diffractive optical element 62 in a scanning optical apparatus, can be suppressed. Hence, a scanning optical apparatus (image forming apparatus) suitable for high-resolution printing, which increases the uniformity of image plane illuminance on the surface to be scanned in the scanning optical apparatus and minimizes aberration changes due to various variations can be realized.

As the characteristic feature unique to the first embodiment, when the tilt angle of the wall portion 32 with respect to the substrate normal is set as $\theta e = \tan^{-1}(h/P)$, the tilt portion 31 and wall portion 32 of the diffraction grating 11 always make a right angle. Hence, the diffraction grating or its mold can be considerably easily manufactured.

Figure 9:
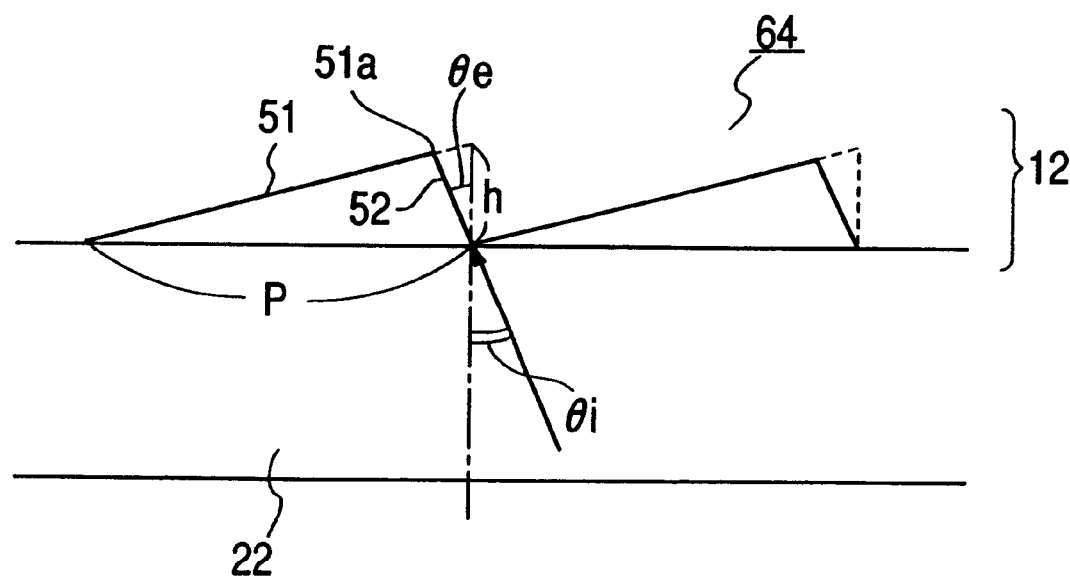
FIG. 9 is an enlarged explanatory view showing a diffractive optical element of the second embodiment of the present invention in the main scanning direction.

FIG. 9 is a sectional view showing a principal part of a diffractive optical element according to the second embodiment of the present invention in the main scanning direction. FIG. 9 shows an enlarged grating portion. The same reference numerals as in FIG. 7 denote the same elements in FIG. 9.

The second embodiment is different from the above-described first embodiment in that a tilt angle θe of a wall portion 52 of a diffraction grating 12 with respect to the substrate normal is changed. The arrangement of remaining portions and optical function are substantially the same as in the first embodiment, and the same effect as in the first embodiment is obtained.

More specifically, the diffraction grating 12 of the second embodiment comprises a tilt portion 51 for mainly generating a power and the wall portion 52 connecting one end portion 51a of the tilt portion 51 to a substrate 22, as shown in FIG. 9. The wall portion 52 is tilted with respect to the substrate normal by the tilt angle θe. In this embodiment, the tilt angle θe of the wall portion 52 with respect to the substrate normal is set to satisfy a relation $$\theta e = \tan^{-1}(h/P) + 5°$$

where h is the depth of the diffraction grating 12, and P is the grating pitch. The tilt angle θe is continuously changed to increase as the distance from the optical axis of a diffractive optical element 64 becomes large.

Figure 10:
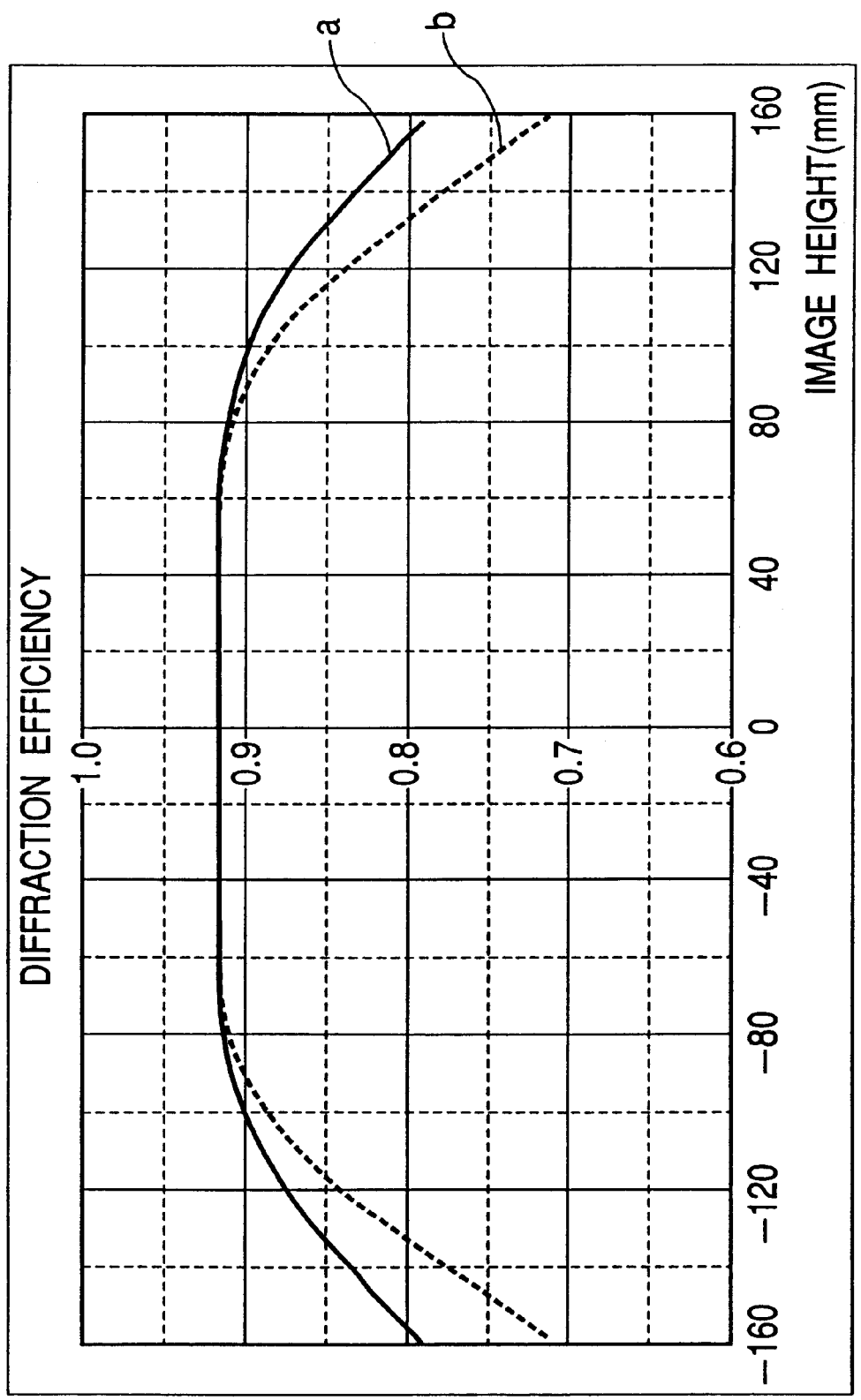
FIG. 10 is an explanatory view showing the diffraction efficiency of the diffractive optical element of the second embodiment of the present invention.

FIG. 10 is an explanatory view showing the diffraction efficiency when the diffractive optical element 64 of the second embodiment is used on an apparatus. The abscissa is converted into a light beam arrival position on the surface to be scanned. The diffraction efficiency is calculated in consideration of the angle of incidence, aspect ratio, tilt angle of the grating wall portion, and the like at each light beam passage position.

Referring to FIG. 10, a solid line "a" indicates the diffraction efficiency in the second embodiment, which is obtained when the wall portion is tilted with respect to the substrate normal by $\theta e=\tan^{-1}(h/P)+5°$. A dotted line "b" indicates a conventional diffraction efficiency obtained when the wall portion is formed perpendicular to the substrate surface.

As is apparent from FIG. 10, when the wall portion of the diffraction grating is tilted with respect to the substrate normal by $\theta e$, the diffraction efficiency in the off-axis region can be improved by about 11.1%.

As described above, in the second embodiment, with a simple arrangement in which the diffraction grating 12 of the diffractive optical element 64 comprises the tilt portion 51 and wall portion 52, and the wall portion 52 is tilted with respect to the substrate normal, a decrease in diffraction efficiency due to a large angle of incidence in the off-axis region and low aspect ratio, which poses a problem in the use of the diffractive optical element 64 in a scanning optical apparatus, can be suppressed. Hence, a scanning optical apparatus (image forming apparatus) suitable for high-resolution printing, which increases the uniformity of image plane illuminance on the surface to be scanned in the scanning optical apparatus and minimizes aberration changes due to various variations can be realized.

As the characteristic feature unique to the second embodiment, when the tilt angle of the wall portion 52 with respect to the substrate normal is set as $\theta e=\tan^{-1}(h/P)+50°$, the tilt portion 51 and wall portion 52 of the diffraction grating 12 always make an obtuse angle (95°). Since the wall portion 52 of the diffraction grating 12 can be tilted even at a large pitch portion near the on-axis region, mold release characteristics in injection molding or replica are improved, and the diffraction efficiency can be prevented from lowering due to errors in manufacturing.

Figure 11:
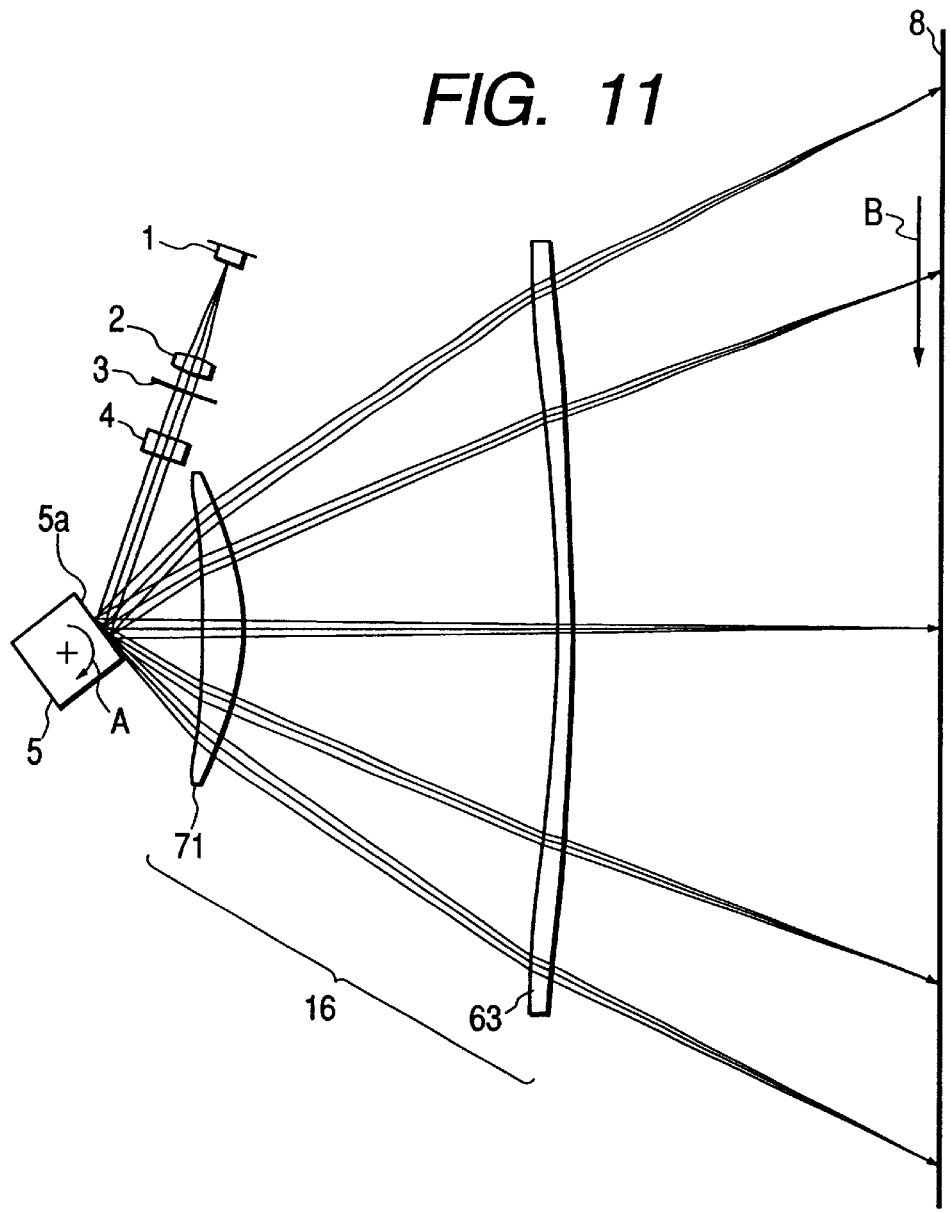
FIG. 11 is a schematic view showing a principal part of a scanning optical apparatus according to the third embodiment of the present invention.
Figure 12:
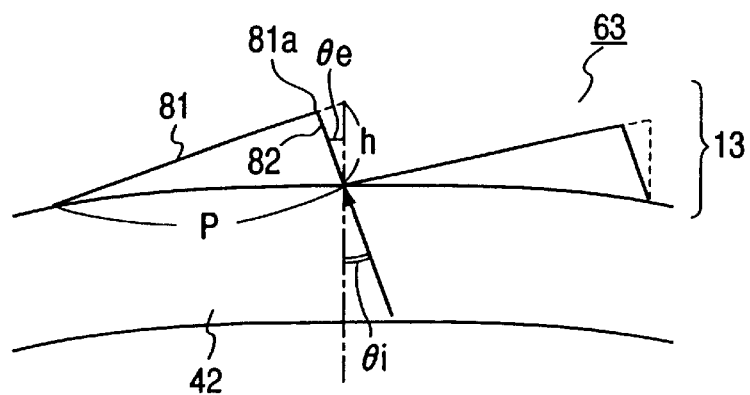
FIG. 12 is an enlarged explanatory view showing a diffractive optical element of the third embodiment of the present invention in the main scanning direction.

FIG. 11 is a sectional view showing a principal part of the optical system of a scanning optical apparatus according to the third embodiment of the present invention in the main scanning direction. FIG. 12 is a sectional view showing principal part of a diffractive optical element shown in FIG. 11 in the main scanning direction. FIG. 12 shows an enlarged grating portion. The same reference numerals as in FIG. 6 denote the same elements in FIG. 11.

The third embodiment is different from the above-described first embodiment in that an elongated diffractive optical element 63 having a curved substrate surface is used. The arrangement of remaining portions and optical function are substantially the same as in the first embodiment, and the same effect as in the first embodiment is obtained.

More specifically, a diffraction grating 13 of the third embodiment comprises a tilt portion 81 for mainly generating a power and a wall portion 82 connecting one end portion 81a of the tilt portion 81 to a substrate 42, as shown in FIG. 12. The wall portion 82 is tilted with respect to the substrate normal by a tilt angle $\theta e$. In this embodiment, the tilt angle $\theta e$ of the wall portion 82 with respect to the substrate normal is set to satisfy a relation $$\theta e=\tan^{-1}(h/P)$$

where h is the depth of the diffraction grating 13, and P is the grating pitch. The tilt angle $\theta e$ is continuously changed to increase as the distance from the optical axis of the diffractive optical element 63 becomes large. This embodiment has the same effect as that when the substrate surface is flat and can improve the diffraction efficiency in the off-axis region as compared to a case wherein the wall portion of the diffraction grating is formed perpendicular to the substrate surface.

Table-2 shows the optical layout in the third embodiment, aspherical coefficients of a toric lens 71, and phase terms of the diffractive optical element 63. In Table-2, the depth of the diffraction grating is h=1.51 μm, the angle of incidence of an outermost off-axis light component on the diffraction grating is $\theta i=22°$, and the grating pitch is P=5.6 μm.

TABLE 2

Third Embodiment
Design Data

| Wavelength, Refractive Index | | |
|---|---|---|
| Wavelength Used | λ (nm) | 780 |
| Refractive Index of Toric Lens 71 | nt | 1.5242 |
| Refractive Index of Elongated Diffractive Element 63 | nd | 1.5242 |
| Light Ray Angle | | |
| Angle of Incidence on Polygon | θp | 70.0 |
| Polygon Maximum Exit Angle | θe | 45.0 |
| Maximum Angle of Incidence on Surface to be Scanned | θi | 23.0 |
| Layout | | |
| Polygon Axis - Toric Lens | e1 | 36.4 |
| Toric Lens 71 Central Thickness | d1 | 11.0 |
| Toric Lens - Elongated Diffractive Element | e2 | 90.5 |
| Elongated Diffractive Element 63 Central Thickness | d2 | 4.0 |
| Elongated Diffractive Element - Surface to be Scanned | Sk | 104.5 |
| Polygon Axis - Surface to be Scanned | L | 246.4 |
| Effective Scanning Width | W | 297.0 |

| | First Surface | Second Surface |
|---|---|---|
| Surface Shape of Toric Lens 71 | | |
| R | −1.06291E + 02 | −5.37548E + 01 |
| K | −3.31352E − 01 | −9.34202E − 01 |
| B4 | 1.30030E − 06 | 2.51064E − 07 |
| B6 | −7.62356E − 11 | 2.80118E − 10 |
| r | 1.55072E + 02 | −2.40083E + 01 |
| D2s | | 1.47931E − 04 |
| D4s | | 5.78375E − 08 |
| D6s | | −1.06573E − 11 |
| D2e | | 2.23682E − 04 |
| D4e | | −1.29434E − 08 |
| D6e | | 2.62146E − 11 |
| Surface Shape of Elongated Diffractive Element 63 | | |
| R | −4.33451E + 02 | −1.72797E + 03 |
| K | −1.19232E + 00 | 6.06107E + 00 |
| B4 | 3.14632E − 08 | −5.49468E + 08 |
| B6 | 1.09311E − 12 | 3.42409E − 12 |
| Phase Function of Elongated Diffractive Element 63 | | |
| b2 | | −5.79065E − 04 |
| b4 | | −1.13552E − 08 |
| b6 | | 3.59430E − 13 |
| d0 | | −5.73306E − 03 |
| d1 | | −9.14465E − 07 |
| d2 | | 8.78326E − 08 |
| d3 | | 3.06812E − 11 |
| d4 | | −8.98137E − 13 |

As described above, in the third embodiment, with a simple arrangement in which the diffraction grating 13 of the diffractive optical element 63 comprises the tilt portion 81 and wall portion 82, and the wall portion 82 is tilted with respect to the substrate normal, a decrease in diffraction efficiency due to a large angle of incidence in the off-axis region and low aspect ratio, which poses a problem in use of the diffractive optical element 63 in a scanning optical apparatus, can be suppressed. Hence, a scanning optical apparatus (image forming apparatus) suitable for high-resolution printing, which increases the uniformity of image plane illuminance on the surface to be scanned in the scanning optical apparatus and minimizes aberration changes due to various variations can be realized.

The tilt angle θe of the wall portion of the diffraction grating with respect to the substrate normal is set as θe=tan$^{-1}$(h/P) in the first and third embodiments, and θe=tan$^{-1}$(h/P)+50° in the second embodiment. When condition (1) below is satisfied, the present invention can be applied as in the first, second, and third embodiments.

$$\tan^{-1}(h/P) \leq \theta e \leq \tan^{-1}(h/P)+10° \tag{1}$$

Condition (1) defines the tilt angle of the wall portion of the diffraction grating with respect to the substrate normal. When condition (1) is not satisfied, the diffraction efficiency lowers in the off-axis region where the angle of incidence is large and aspect ratio is low, and the uniformity of image plane illuminance on the surface to be scanned degrades.

According to the present invention, the diffraction grating of a diffractive optical element is formed from a tilt portion for mainly generating a power and a wall portion connecting one end portion of the tilt portion to a substrate, and the wall portion is tilted with respect to the normal of the substrate surface. Hence, a diffractive optical element suitable for high-resolution printing, which suppresses a decrease in diffraction efficiency of the diffractive optical element especially in the off-axis region, increases the uniformity of image plane illuminance on a surface to be scanned, and minimizes aberration changes due to various variations with the simple arrangement without increasing cost and a scanning optical apparatus using the same can be provided.

What is claimed is:

1. A scanning optical apparatus comprising:

a light source;

a conversion optical element for converting a light beam emitted by said light source into a substantially collimated light beam;

a deflection element for deflecting the converted substantially collimated light beam; and a scanning optical element for forming an image of the light beam deflected by said deflection element on a surface to be scanned, wherein said scanning optical element comprises at least one refractive optical element and at least one diffractive optical element having a diffraction grating, said diffraction grating being formed on a substrate surface and having a tilt portion for generating power and a wall portion connecting one end portion of said tilt portion to the substrate, and said wall portion being tilted with respect to a normal to the substrate surface, and a tilt angle θe of said wall portion with respect to the normal to the substrate surface continuously changes to increase as a distance from an optical axis of said diffractive optical element becomes large.

2. An apparatus according to claim 1, wherein the diffraction grating is formed on a side of the surface to be scanned of said diffractive optical element.

3. An apparatus according to claim 1, wherein a tilt angle θe of said wall portion of said diffraction grating with respect to the normal to the substrate surface satisfies $$\tan^{-1}(h/P) \leq \theta e \leq \tan^{-1}(h/P)+10°$$

where h is a depth of said diffraction grating, and P is a grating pitch.

4. An apparatus according to claim 1, wherein said diffractive optical element is manufactured by forming said diffraction grating on a glass substrate by a replica process.

5. An apparatus according to claim 1, wherein said diffractive optical element is manufactured by integrally forming the substrate and said diffraction grating from plastic material by injection molding.

6. An apparatus according to claim 1, wherein said refractive optical element comprises a toric lens made of plastic and has different powers in main scanning and sub-scanning directions.

7. An apparatus according to claim 1, wherein said substrate surface comprises a flat surface or a curved surface.

* * * * *

UNITED STATES PATENT AND TRADEMARK OFFICE
CERTIFICATE OF CORRECTION

PATENT NO. : 6,295,163 B1                           Page 1 of 1
DATED     : September 25, 2001
INVENTOR(S) : Manabu Kato It is certified that error appears in the above-identified patent and that said Letters Patent is hereby corrected as shown below:

Column 1,
Line 30, "showing" should read -- showing a --.

Column 2,
Line 8, "to" should read -- to a --.

Column 4,
Line 51, "showing" should read -- showing a --.

Column 5,
Line 49, "5aof" should read -- 5a of --.

Column 6,
Line 32, "$+(d_0+d_1Y+d_2Y^{2+d}{}_3Y^3+d_4Y^4)Z^2$" should read
-- $+(d_0+d_1Y+d_2Y^2+d_3Y^3+d_4Y^4)Z^2$ --;
Line 34, "and+1st-order" should read -- and+1st-order --; and
Table 1, line 60, "diffractive" should read -- Diffractive --.

Column 9,
Line 36, "showing" should read -- showing a --.

Column 11,
Line 7, "$\theta e=\tan^{-1}(h/P)+50°$" should read -- $\theta e=\tan^{-1}(h/P)+5°$ --.

Signed and Sealed this

Twenty-first Day of May, 2002

Attest:

*Attesting Officer*

JAMES E. ROGAN
*Director of the United States Patent and Trademark Office*